United States Patent
Yamamoto et al.

[15] 3,655,449
[45] Apr. 11, 1972

[54] DRY CELL COMPRISING A SEPARATOR COMPOSED OF THREE LAYERS

[72] Inventors: Shohei Yamamoto, Toyonaka-shi; Jun Watanabe, Osaka; Susumu Hosoi, Neyagawa-shi; Masahiro Kuwazaki; Akira Ota, both of Osaka; Toshikatsu Takata; Junichi Asaoka, both of Moriguchi-shi, all of Japan

[73] Assignee: Matsushita Electric Industrial Co., Ltd., Osaka, Japan

[22] Filed: Oct. 20, 1969

[21] Appl. No.: 867,795

[30] Foreign Application Priority Data

Oct. 28, 1968 Japan....................................43/80162

[52] U.S. Cl.................................................136/107, 136/145
[51] Int. Cl..................................................................H01m 21/00
[58] Field of Search..........................136/107, 111, 131–132, 136/142–147

[56] References Cited

UNITED STATES PATENTS

| | | | |
|---|---|---|---|
| 2,635,127 | 4/1953 | Yardney et al. | 136/146 X |
| 2,859,266 | 11/1958 | Garvey et al. | 136/111 |
| 2,942,057 | 6/1960 | Huber et al. | 136/145 |
| 3,232,916 | 2/1966 | Fogle | 136/146 X |
| 3,272,653 | 9/1966 | Solomon et al. | 136/132 X |

*Primary Examiner*—Anthony Skapars
*Attorney*—Stevens, Davis, Miller & Mosher

[57] ABSTRACT

A dry cell having a separator layer interposed between a positive electrode and a negative zinc electrode, which separator layer is composed of three layers consisting of a paper having excellent water absorbing and water retaining properties, a barrier membrane formed of polyvinyl alcohol alone or polyvinyl alcohol incorporating a material which has at least one of water absorbing property, water retaining property, swelling property and adhesive property, and a paste layer.

12 Claims, 10 Drawing Figures

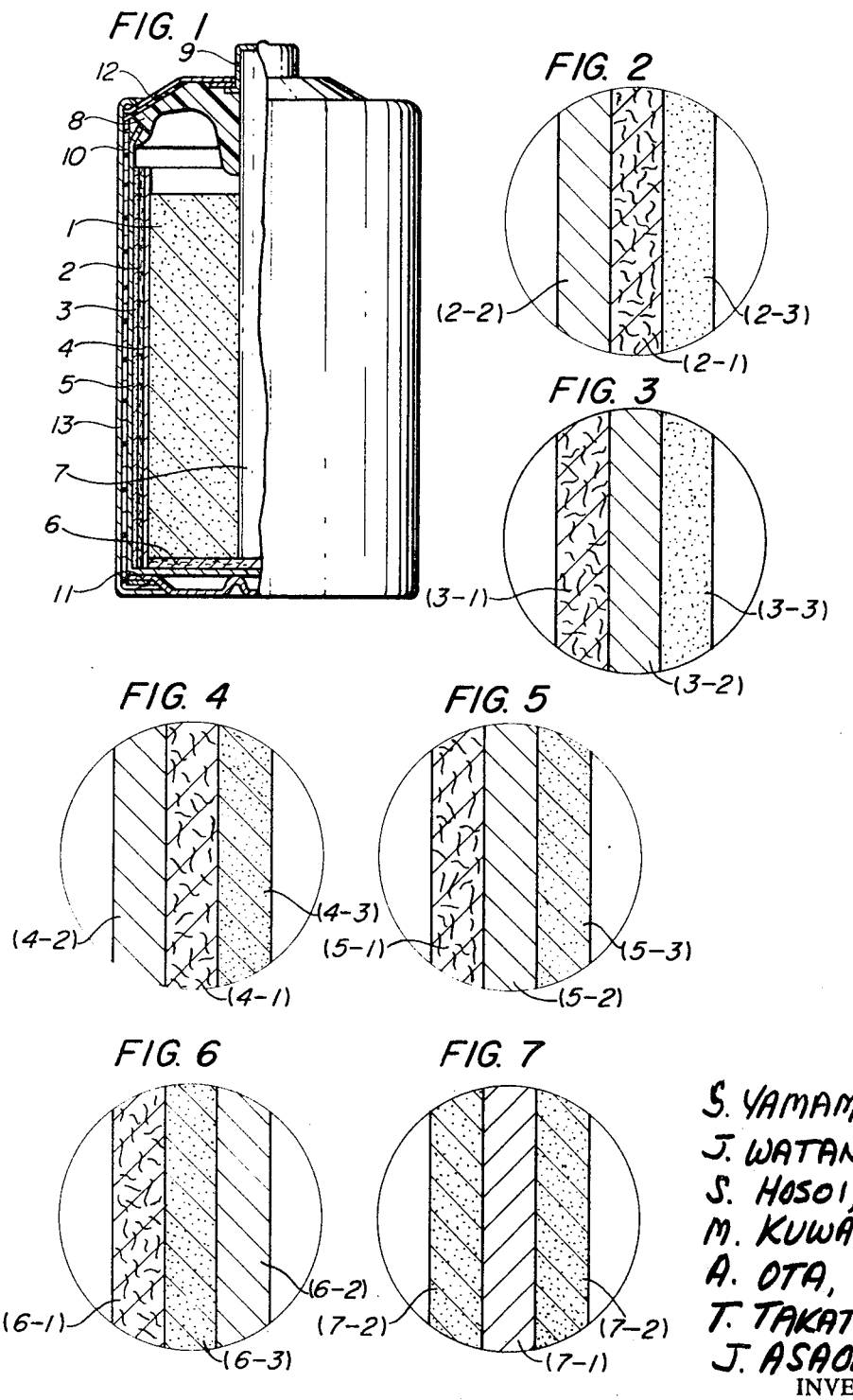

DRY CELL COMPRISING A SEPARATOR COMPOSED OF THREE LAYERS

The present invention relates to improvements in the separator layer used in dry cells. Namely, the present invention contemplates improving the discharge performance, preservability and electrolyte leakage resistibility of a dry cell as well as simplifying the production process of the dry cell, by interposing between a positive electrode and a negative zinc electrode an integral separator layer composed of three layers consisting of a barrier membrane formed of polyvinyl alcohol alone or polyvinyl alcohol having incorporated therein one or a plurality of materials having at least one of water absorbing property, water retaining property, swelling property and adhesive property with respect to an electrolyte liquid, a paper having excellent water absorbing property and excellent water retaining property, and a paste layer consisting of a natural paste or a synthetic paste, etc.

In the art of the preparation of manganese dioxide dry cells which have about a century of history behind them, a success has been made in developing a high performance dry cell by the use of electrolytic manganese dioxide having a high available oxygen content in lieu of natural manganese dioxide which is low in available oxygen content. However, with the advance of civilization, the development of electronics, the tendency of the electric appliances toward cordless ones and the tendency of the demand for electric appliances being diversified in both type and function, in recent years, the demand for an inexpensive manganese dioxide dry cell has increased more and more, and the performance of the dry cell is also required to be further improved. For improvement in performance, particularly the intermittent discharge performance, of a dry cell, the amount of the positive electrode mix contained in the dry cell is obviously an influential factor and how to increase the amount of the positive electrode mix charged in the limited space within the cell, while simultaneously taking the electrolyte leakage resistibility into account, is of particular importance. With reference to the separator layer, a paste type separator layer using a gelatinized starch was used in the past but such a separator layer is so large in thickness that the effective space within the dry cell cannot be efficiently utilized. For this reason, the paste type separator layer was replaced by a paper type separator layer which consists of a sheet of paper having a paste layer formed on one side thereof. However, the paper type separator layer of the structure described had the drawback that the paste material in the paste layer tends to be decomposed by oxidation, and the water in the paste layer is transferred into the positive electrode mix and the paste is also transferred concurrently, so that lowering of the depolarizing ability of manganese dioxide and degradation of the discharg performance, the preservability and electrolyte leakage resistibility of the cell were inevitable. In addition, when a method was employed for the production of the dry cell, in which a carbon rod is inserted after charging the positive electrode mix, the lower portion of the separator-constituting paper was subjected to a considerably large side pressure upon the insertion of the carbon rod and thus there was the danger of the positive electrode directly contacting the negative zinc electrode upon penetrating through the paper. In order to block the positive electrode transferring toward the negative zinc electrode, the idea of using a barrier membrane was arrived at and several separator layers, comprising such a membrane, have been proposed to this date. However, none of them are satisfactory in respect of water absorbing property, water retaining property, swelling property or adhesive property, and the incorporation of the barrier membrane in the separator layer has resulted in an increase in the internal resistance of the dry cell. At the same time, a sharp increase in the concentration of zinc ion at the paste layer, resulting from dissolution of the negative zinc electrode in the process of discharge, has resulted in the generation of a counter electromotive force within the dry cell, because the diffusion velocity of the ion penetrating through the barrier membrane is very slow, and consequently the discharge performance of the cell has substantially been lowered. As described above, only a few examples of the separator layer of the type incorporating a barrier membrane have been available to this date and an entirely satisfactory separator layer has not yet been developed, although separator layer of this type will be absolutely necessary for the dry cells of the future.

It is, therefore, the object of the present invention to provide a separator layer having a barrier membrane. The present invention will be described in detail hereinafter with reference to the accompanying drawings, in which:

FIG. 1 is a side elevation of the dry cell according to the present invention, with a portion thereof shown in cross-sections;

FIG. 2 is an enlarged cross-sectional view of a portion of the separator layer of the dry cell shown in FIG. 1;

Figure 8:
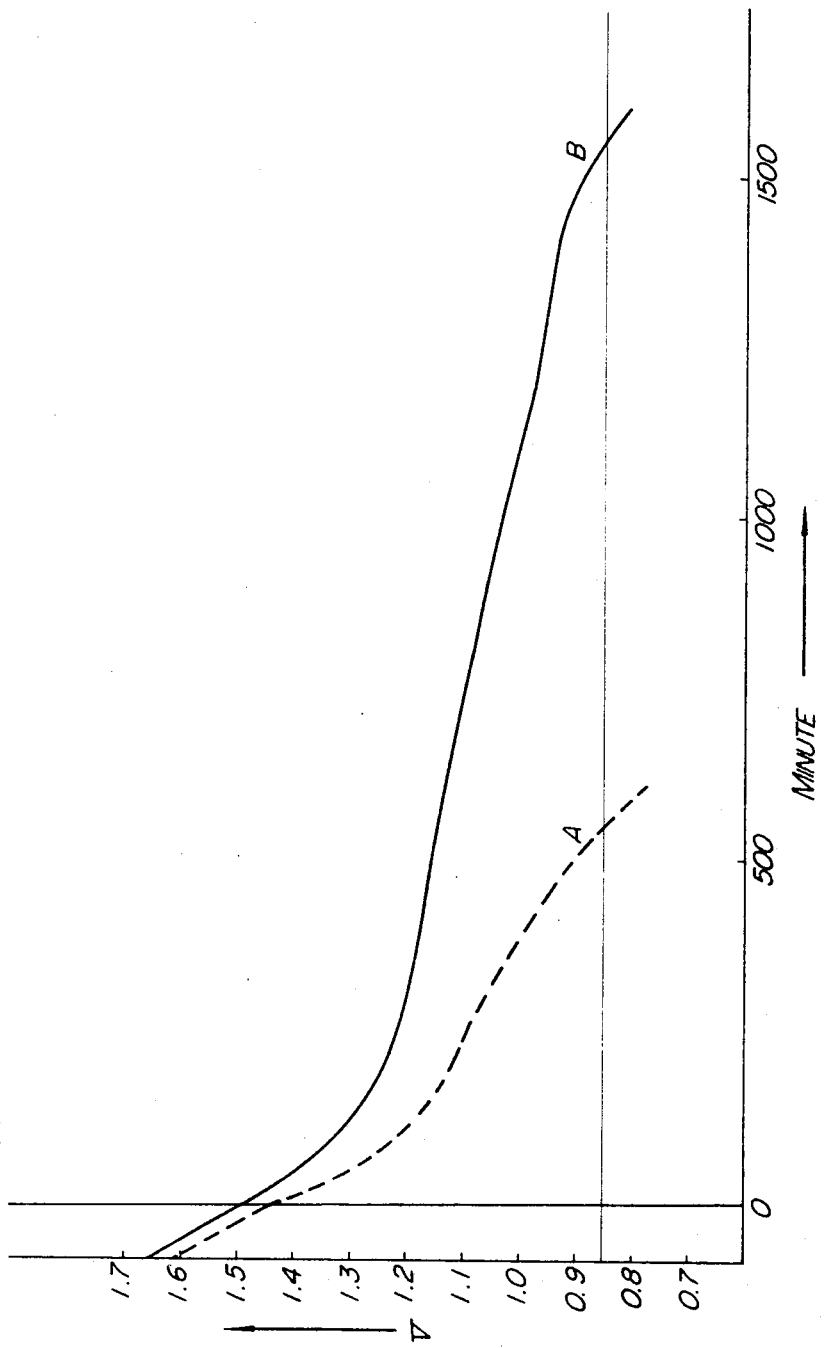
Figure 9:
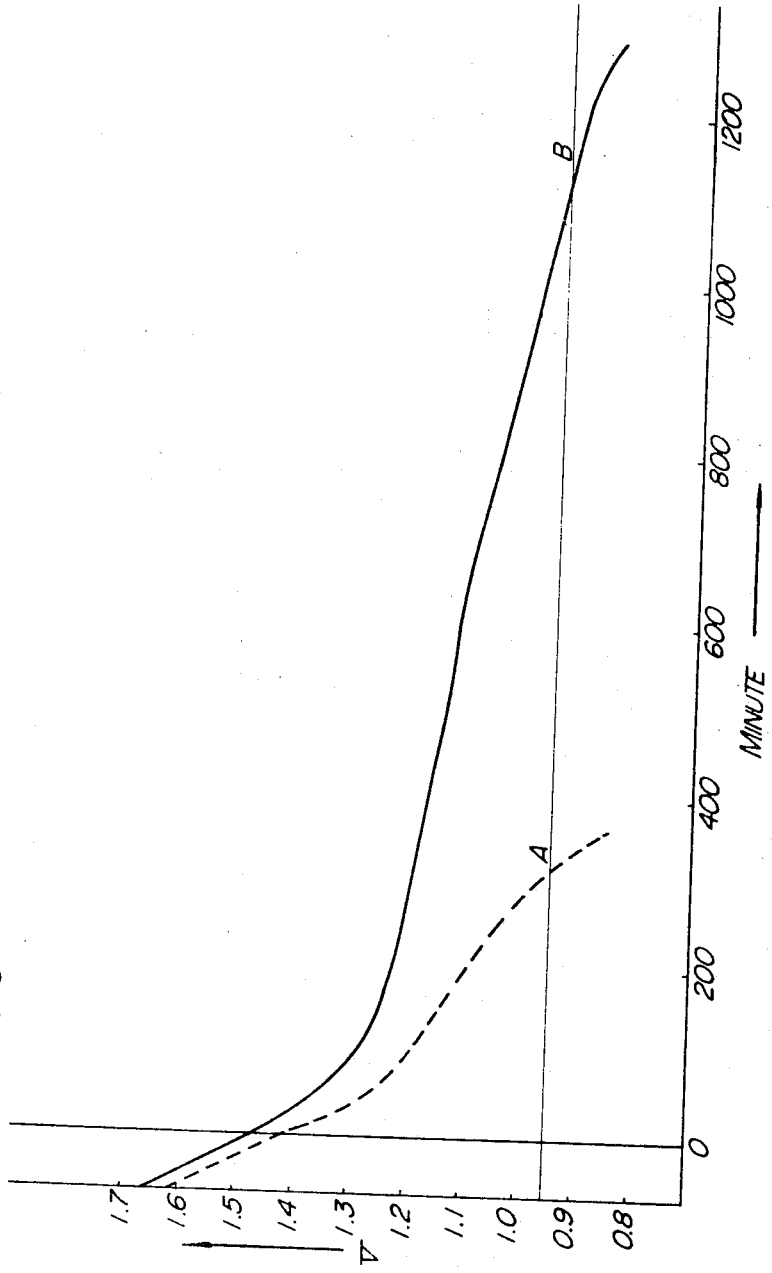
Figure 10:
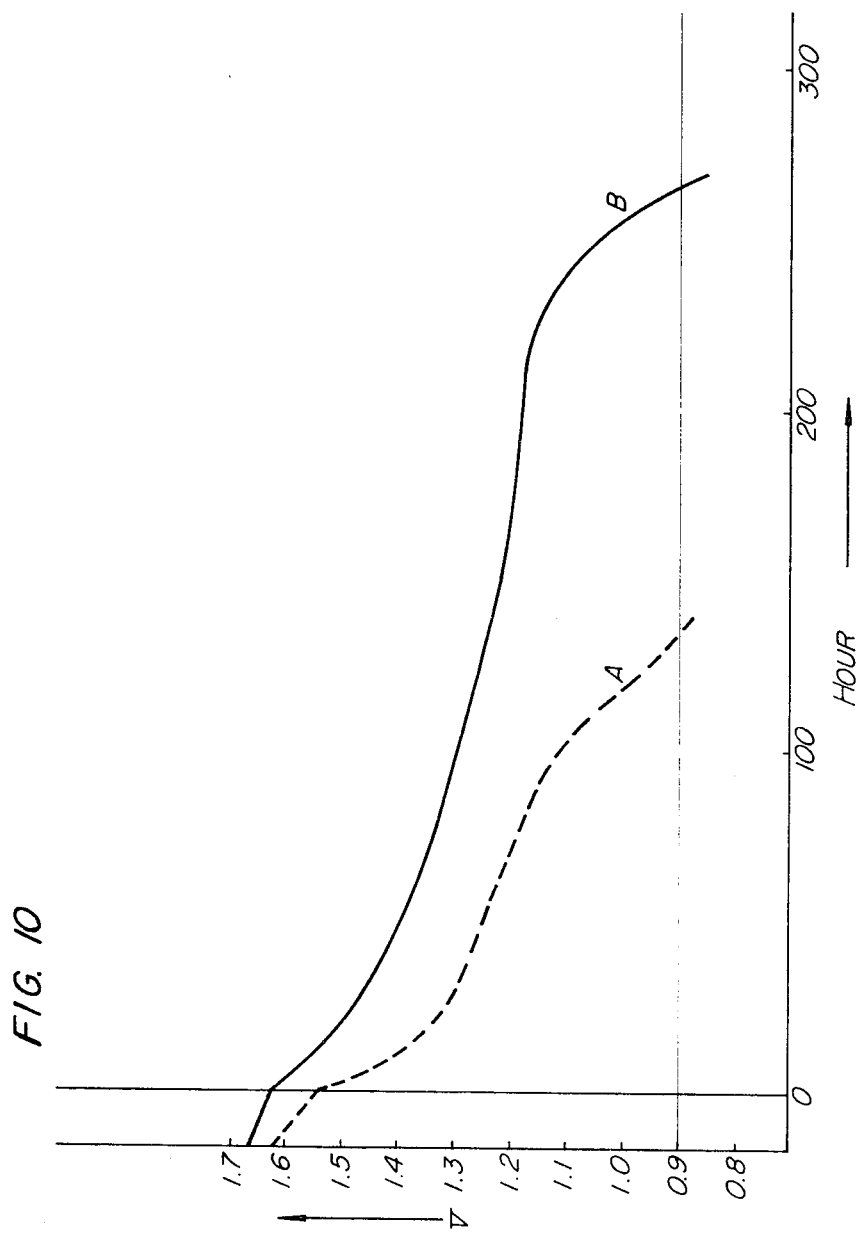

FIGS. 3 to 7 inclusive are enlarged cross-sectional views of a portion of the other types of the separator layer according to the invention respectively; and FIGS. 8 to 10 inclusive are characteristic diagrams showing the discharge performance of the dry cell of this invention respectively.

The separator layer according to the present invention is composed integrally of three layers consisting of a barrier membrane which is formed of polyvinyl alcohol alone or polyvinyl alcohol incorporating one or a plurality of materials having at least one of water absorbing property, water retaining property, swelling property and adhesive property and which will be dissolved into a pasty state during the discharge of a dry cell, a sheet of paper having an excellent water absorbing property and excellent water retaining property, and a paste layer consisting of a natural paste, synthetic paste, etc. The present separator layer can sufficiently attain the purpose of separation in a thickness only one tenth of that of the conventional paste type separator layer. Therefore, the amount of the positive electrode can be increased by an amount corresponding to the decrease in thickness and the discharge performance of the cell can be improved accordingly.

The barrier membrane used in the separator layer of this invention is formed of a polyvinyl alcohol having a polymerization degree of 1,200 to 1,600 and a saponification degree of 75 to 95 and capable of being dissolved into a pasty state during discharge of the dry cell, or of such polyvinyl alcohol incorporating one or a plurality of materials having at least one of water absorbing property, water retaining property, swelling property and adhesive property with respect to an electrolyte liquid and also capable of being dissolved into a pasty state during discharge of the dry cell. The materials to be incorporated in the polyvinyl alcohol include coloidal silica, pulp, agar, polyacrylamide, hydroxypropyl cellulose, starch, wheat flour, corn starch, karaya gum, methyl cellulose, carboxymethyl cellulose, etc. These materials may be contained in an amount of 1 to about 50 percent. Such a barrier membrane can be simply produced by adding to a liquid polyvinyl alcohol the above-mentioned material or materials in powdered form or in solution in a solvent and shaping the resultant mixture into the shape of a film. The barrier membrane thus produced excels in water absorbing property, water retaining property, swelling property and adhesive property, and hence a large amount of the electrolyte liquid can be contained in the barrier membrane proper. Therefore, the separator layer will create a very small internal resistance when incorporated in the dry cell. Further, since the diffusion of the ions through the barrier membrane takes place utilizing the water as the conductive medium which is present in the vicinity of the adjacent material, the diffusion velocity of the ions, for example, through a polyvinyl alcohol barrier membrane containing 10 percent of colloidal silica is higher than 5 times that through a barrier membrane formed solely of polyvinyl alcohol and, therefore, a sharp increase in zinc ion concentration at the paste layer caused by dissolution of the negative zinc electrode during discharge of the cell can considerably be alleviated.

The most important feature of the barrier membrane according to the present invention is that it is dissolved into a pasty state, during discharge of the cell, due to the increasing zinc ion concentration caused by the solution of the negative zinc electrode. Furthermore, the barrier membrane of this invention can be caused to dissolve at any point of capacity, by changing the polymerization degree and the saponification degree of the membrane, the amount and the type of a material to be incorporated and the mixing ratio of the three components of the electrolyte liquid used in the dry cell, i.e. ammonium chloride, zinc chloride and water, if the mode of discharge of the cell is previously known. Once the barrier membrane has been dissolved into a pasty state, the resultant paste exhibits properties which are less inferior or even superior to those of the paste layer in the conventional paste-type separator layer, and the diffusion velocity of ions is further increased. Before dissolution, the barrier membrane of course serves its intended purpose sufficiently by preventing the transfer of the paste material and water from the paste layer to the positive electrode and the penetration of the depolarizer from the positive electrode to the paste layer. The separator layer according to this invention is, as shown in FIGS. 1 and 2, composed of a sheet of paper, such as kraft paper or filter paper, a barrier membrane formed on one side (the side facing the positive electrode) of said paper and a paste layer formed on the other side (the side facing the negative zinc electrode) of said paper. By using a paper having an excellent water absorbing property and excellent water retaining property, the abovementioned advantageous feature of the barrier membrane will become more apparent and the paste material in the paste layer will serve more effectively as a retainer of the electrolyte liquid.

Besides the structure of the separator layer shown in FIG. 2 wherein a barrier membrane (2 — 2) is formed on one side (the side facing the positive electrode) of a paper (2 - 1), such as a kraft paper or filter paper) and a paste layer (2 — 3) is formed on the other side (the side facing the negative zinc electrode), the separator layer of this invention can be formed in several other structures, by taking advantage of the characteristic of the barrier membrane that it will become pasty on dissolution, e.g. in the structure shown in FIG. 3 wherein a paste layer (3 — 3) is formed on one side of the barrier membrane (3 - 2) and a paper layer (3 - 1) is formed on the other side thereof.

Instead of the above-described barrier membrane which retains the shape of the membrane before it is incorporated in a dry cell but will be dissolved into a pasty state after incorporation into the dry cell, an insoluble barrier membrane may also be used which retains its shape until the dry cell is completely discharged.

FIG. 1 is a side elevation, partially in secton, of a dry cell incorporating the present barrier membrane of the structure shown in FIG. 2. This dry cell is produced in the following manner: Namely, a positive electrode 1 composed primarily of manganese dioxide, acetylene black, ammonium chloride, zinc chloride and water is suitably kneaded and molded into shape. On the other hand, a dispersion of a paste material, such as a natural paste, synthetic paste, etc., in an electrolyte liquid is applied and dried on one side of a 0.05 to 0.15 mm. thick kraft paper 2 having an excellent water absorbing property and excellent water retaining property, to form a paste layer 3, while a 40 $\mu$ thick film 4 of a polyvinyl alcohol having a saponification degree of 75 to 95 and a polymerization degree of 1,200 to 1,600 and having 10 percent of colloidal silica and 5 percent of starch incorporated therein, is laminated on the other side of said paper, whereby an integral separator layer consisting of a laminate of three layers is formed. The separator layer thus formed is wrapped around the aforesaid shaped positive electrode in such a manner that the paste layer thereof will be opposed by a negative zinc electrode 5, and the resultant assembly is placed in the negative zinc electrode container or can in which a bottom paper 6 and the electrolyte liquid have previously been disposed. Thereafter, a positive carbon rod electrode 7 is inserted into the central hole in the negative electrode. Thus, a bare dry cell is produced. In FIG. 1, reference numeral 8 designates a resin-made closure member, 9 a metallic collector, 10 a shrinkable tube, 11 a metallic bottom plate, 12 a metallic closure plate and 13 a metallic outer casing. The separator layer of this invention can be produced in a simple manner, can be handled very easily during the production process of the dry cell, enables the production process of the dry cell to be simplified and it is well able to withstand the large pressure to which the entire surface of the lower portion thereof is subjected in the process of producing the dry cell by a method wherein the carbon rod is inserted after the positive electrode mix has been charged in a container. The separator layer of this invention also shows an excellent performance, with the effects of the barrier membrane and the paste layer which are further enhanced by an abundant electrolyte liquid retained by the paper having an excellent water absorbing and water retaining properties, and can be said as an ideal separator layer. As will be understood from the foregoing, the dry cell incorporating the present separator layer has an excellent discharge capacity, preservability and electrolyte leakage resistibility.

Another example of the barrier membrane-incorporating separator layer according to the present invention is shown in FIG. 4. This separator layer comprises a 0.1 mm. thick kraft paper (4 - 1) having an excellent water absorbing property and excellent water retaining property, a 40 $\mu$ thick barrier membrane-constituting film (4 - 2) formed on one side (the side facing the positive electrode) of said paper, said film consisting of a polyvinyl alcohol having a saponification degree of 75 to 95 and a polymerization degree of 1,200 to 1,600 and having 10 percent of colloidal silica incorporated therein, and a paste layer-constituting film (4 - 3) containing 15 percent of starch and laminated on the other side (the side facing the negative zinc electrode) of said paper, all of which are combined into a unitary piece. Still another type of the present separator layer is shown in FIG. 5 wherein a paste layer-constituting film (5 - 3), same as that of FIG. 4, is laminated on one side (the side facing the negative zinc electrode) of a barrier membrane-constituting film (5 - 2), same as that of FIG. 4, and a kraft paper (5 - 1), same as that of FIG. 4, is laminated on the other side (the side facing the positive electrode) of said film (5 - 2). FIG. 6 shows still another type of the present separator layer wherein a barrier membrane-constituting film (6 - 2) is laminated on one side (the side facing the positive electrode) of a paste layer-constituting film (6 - 3) and a kraft paper is laminated on the other side (the side facing the negative zinc electrode) of the same. FIG. 7 shows still another type of the present separator layer wherein a film (7 - 2) containing 15 percent of starch is integrally laminated on both sides of a 40 $\mu$ thick film (7 - 1) of a polyvinyl alcohol having a saponification degree of 75 to 95 and a polymerization degree of 1,200 to 1,600 and having 10 percent of colloidal silica incorporated therein. In case of the separator layer shown in FIG. 7, one of the films (7 - 2) will be opposed by the positive electrode and hence part of the paste material in said film will be transferred into the positive electrode. However, since the separator layer is so thin and the amount of the paste material transferring into the positive electrode is so small that the performance of the dry cell will not be substantially impaired.

With A representing a conventional paste-type dry cell and B representing a dry cell incorporating the present separator layer of the type shown in FIG. 2, both cells were compared with each other. FIG. 8 shows the discharge performances of the cells compared on the basis of a UM-1D Type, by discharging the cells intermittently (30 minutes/day) with a constant resistance of 4 ohms connected thereto, until the voltage dropped to 0.85 V; FIG. 9 shows the discharge performances of the cells compared on the basis of HIF of ASA, by discharging the cells intermittently (4 minutes/15 minutes, 8 hours/day) with a constant resistance of 4 ohms connected thereto, until the voltage dropped to 0.90 V; and FIG. 10 shows the discharge performances of the cells obtained by discharging the cells intermittently (4 hours/day) with a constant resistance of 40 ohms connected thereto, until the voltage dropped to 0.90 V. Table 1 shows the preservabilities of the respective cells and Table 2 shows the electrolyte leakage resistibilities of the same.

TABLE 1

Preservability

Comparison of Preservability by the Number of Dry Cells of Unsatisfactory Voltage per 100 Dry Cells

|   | After storage for 6 months at 45°C. | After storage for 12 months at 45°C. |
|---|---|---|
| A | 3 | 5 |
| B | 0 | 0 |

TABLE 2

Electrolyte Leakage Resistibility

Comparison in Electrolyte Leakage Resistibility by the Number of Leakage-Showing Dry Cells After 4 Ω, 24 Hours Continuous Discharge per 100 Dry Cells

|   | After storage for 30 days | After storage for 60 days |
|---|---|---|
| A | 19 | 41 |
| B | 0 | 0 |

We claim:

1. A dry cell comprising a positive electrode depolarizer, a negative zinc electrode and a separator layer interposed between said positive electrode depolarizer and said negative zinc electrode, wherein said separator layer comprises three layers consisting essentially of a paper layer having water absorbing property and water retaining property, an ion-permeable barrier membrane consisting essentially of polyvinyl alcohol having a saponification degree of 75 to 95 and a polymerization degree of 1,200 to 1,600, and a paste layer.

2. A dry cell as defined in claim 1, wherein said barrier membrane is disposed adjacent said positive electrode depolarizer, said paste layer is disposed adjacent said negative zinc electrode, and said paper layer is interposed between said barrier membrane and said paste layer.

3. A dry cell as defined in claim 1, wherein said paper layer is disposed adjacent said positive electrode depolarizer, said paste layer is disposed adjacent said negative zinc electrode, and said barrier membrane is interposed between said paper layer and said paste layer.

4. A dry cell comprising a positive electrode depolarizer, a negative zinc electrode and a separator layer interposed between said positive electrode depolarizer and said negative zinc electrode, wherein said separator layer comprises three layers consisting essentially of a paper layer having water absorbing property and water retaining property, an ion-permeable barrier membrane consisting essentially of polyvinyl alcohol having a saponification degree of 75 to 95 and a polymerization degree of 1,200 to 1,600 and having incorporated therein at least one material having at least one of water absorbing, water retaining, swelling and adhesive properties, and a paste layer.

5. A dry cell as defined in claim 4, wherein said at least one material consists of at least one member selected from the group consisting of colloidal silica, polyacrylamide, starch, wheat flour, corn starch, methylethyl cellulose, carboxymethyl cellulose and hydroxypropyl cellulose.

6. A dry cell as defined in claim 4, wherein said barrier membrane is disposed adjacent said positive electrode depolarizer, said paste layer is disposed adjacent said negative zinc electrode, and said paper layer is interposed between said barrier membrane and said paste layer.

7. A dry cell as defined in claim 4, wherein said paper layer is disposed adjacent said positive electrode depolarizer, said paste layer is disposed adjacent said negative zinc electrode, and said barrier membrane is interposed between said paper layer and said paste layer.

8. A dry cell comprising a positive electrode depolarizer, a negative zinc electrode and a separator layer interposed between said positive electrode depolarizer and said negative zinc electrode, wherein said separator layer comprises three layers, consisting essentially of a paper layer having water absorbing and water retaining properties, an ion-permeable barrier membrane consisting essentially of polyvinyl alcohol having a saponification degree of 75 to 95 and a polymerization degree of 1,200 to 1,600, and a paste layer consisting essentially of electrolyte soluble polyvinyl alcohol.

9. A dry cell as defined in claim 8, wherein said paste layer consists essentially of electrolyte soluble polyvinyl alcohol and at least one material having at least one of water absorbing, water-retaining and swelling properties.

10. A dry cell as defined in claim 9, wherein said at least one material consists of at least one member selected from the group consisting of colloidal silica, polyacrylamide, starch, wheat flour, corn starch, methylethyl cellulose, carboxymethyl cellulose and hydroxypropyl cellulose.

11. A dry cell as defined in claim 1, wherein said barrier membrane is electrolyte insoluble at a first stage of discharge of said cell and is electrolyte soluble at a second, later stage of discharge of said cell.

12. A dry cell as defined in claim 8, wherein said barrier membrane is electrolyte insoluble at a first stage of discharge of said cell and is electrolyte soluble at a second, later stage of discharge of said cell.

* * * * *